(12) United States Patent
Sharma

(10) Patent No.: US 6,498,711 B1
(45) Date of Patent: Dec. 24, 2002

(54) DEFORMABLE MICRO-ACTUATOR WITH GRID ELECTRODE

(75) Inventor: Ravi Sharma, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 49 days.

(21) Appl. No.: 09/708,353

(22) Filed: Nov. 8, 2000

(51) Int. Cl.⁷ ................................................. H02N 2/00
(52) U.S. Cl. ..................................................... 361/233
(58) Field of Search ..................... 361/233; 307/132 M, 307/139, 140, 143; 347/68, 70, 71

(56) References Cited

U.S. PATENT DOCUMENTS

| | | | |
|---|---|---|---|
| 2,896,507 A | 7/1959 | Mast et al. | 359/292 |
| 3,716,359 A | 2/1973 | Sheridon | 430/19 |
| 4,065,308 A | 12/1977 | Bergen | 430/50 |
| 4,163,667 A | 8/1979 | Wysocki | 430/67 |
| 4,646,106 A | 2/1987 | Howkins | 347/9 |
| 5,495,280 A | 2/1996 | Gehner et al. | 347/258 |
| 5,739,832 A | 4/1998 | Heinzl et al. | 347/68 |
| 5,764,258 A | 6/1998 | Hetzer et al. | 347/35 |
| 5,867,301 A | 2/1999 | Engle | 359/291 |

FOREIGN PATENT DOCUMENTS

| WO | WO 99/17083 | 4/1999 | G01D/15/16 |
|---|---|---|---|

OTHER PUBLICATIONS

USSN 09/671,438 entitled Deformable Micro–Actuator, by Ravi Sharma et al., filed Sep. 27, 2000.

Primary Examiner—Ronald W. Leja
(74) Attorney, Agent, or Firm—Milton S. Sales

(57) ABSTRACT

A micro-actuator includes a body of deformable elastomer material having opposed first and second surfaces spaced apart by a predetermined at-rest dimension. A charge mechanism is coupled to one of the opposed surfaces for applying an electrical charge across the body in a first direction. The charge is spatially varied in a second direction substantially normal to the first direction so as to create spatially varied mechanical forces across the body such that body exhibits spatially varied growth in the first direction. A rigid member is associated with the second opposed surface of the body so as to move in the first direction in response to growth of the body. The charge mechanism may include a grille electrode connectable to an electrical potential source. An electrically conductive flexible layer is provided on the second surface between the second surface and the rigid member, and is connectable to the electrical potential source so as to induce a force between the flexible layer and the grille electrode upon application of an electrical field. A stationary rigid substrate is provided between the first surface and the grille electrode to establish a rigid mechanical boundary at the first surface.

6 Claims, 2 Drawing Sheets

DEFORMABLE MICRO-ACTUATOR WITH GRID ELECTRODE

CROSS REFERENCE TO RELATED APPLICATIONS

Reference is made to commonly assigned, U.S. patent applications Ser. No. 09/671,438 entitled DEFORMABLE MICRO-ACTUATOR, by Ravi Sharma et al., filed Sep. 27, 2000 and Ser. No. 09/708,354 entitled ASSISTED DROP-ON-DEMAND INKJET PRINTER USING DEFORMABLE MICRO-ACTUATOR, by Ravi Sharma, filed Nov. 8, 2000, now U.S. Pat. No. 6,352,337 issued Mar. 5, 2002.

FIELD OF THE INVENTION

This invention relates to micro-actuators usable to produce controlled movements.

BACKGROUND OF THE INVENTION

U.S. Pat. No. 2,896,507 describes an imaging member which includes an elastically deformable layer sandwiched between a pair of electrode plates. In operation, an electrical field is established across the deformable layer, thus causing this layer to deform. The deformation produces relative movement between the electrode plates. U.S. Pat. No. 3,716,359 discloses improved thin flexible metallic layer electrode plates comprising a plurality of different metals such as, for example, gold, indium, aluminum, silver, magnesium, copper, cobalt, iron, chromium, nickel, gallium, cadmium, mercury, and lead. Various techniques for forming the metallic layers on the elastomer layer are described including, for example, by vacuum evaporation. U.S. Pat. No. 4,163,667 describes the use of a composition of titanium and silver for use as the flexible conductive metallic layer electrode plates in imaging members.

U.S. Pat. No. 5,867,301 discloses a phase modulating device wherein the shape of a reflective surface can be modulated by a localized electric field. A grille electrode establishes inhomogeneous electrostatic forces; leading to compressional forces on a deformable media. Thickness variations in the deformable media due to variations in the electric fields lead to optical path length differences in a wavefront which traverses a target. This in turn leads to phase modulations of the wavefront.

DISCLOSURE OF THE INVENTION

It is an object of the present invention to provide a deformable micro-actuator having a grille electrode to establish inhomogeneous electrostatic forces over an elastomer material thereby producing a significant amount of relative movement between the pair of electrode plates in response to the application of a reasonable electrical field.

According to a feature of the present invention, a micro-actuator includes a body of deformable elastomer material having opposed first and second surfaces spaced apart by a predetermined at-rest dimension. A charge mechanism is coupled to one of the opposed surfaces for applying an electrical charge across the body in a first direction. The charge is spatially varied in a second direction substantially normal to the first direction so as to create spatially varied mechanical forces across the body such that body exhibits spatially varied growth in the first direction. A rigid member is associated with the second opposed surface of the body so as to move in the first direction in response to growth of the body.

According to a preferred embodiment of the present invention, the charge mechanism includes a grille electrode connectable to an electrical potential source. An electrically conductive flexible layer is provided on the second surface between the second surface and the rigid member, and is connectable to the electrical potential source so as to induce a force between the flexible layer and the grille electrode upon application of an electrical field. A stationary rigid substrate is provided between the first surface and the grille electrode to establish a rigid mechanical boundary at the first surface.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
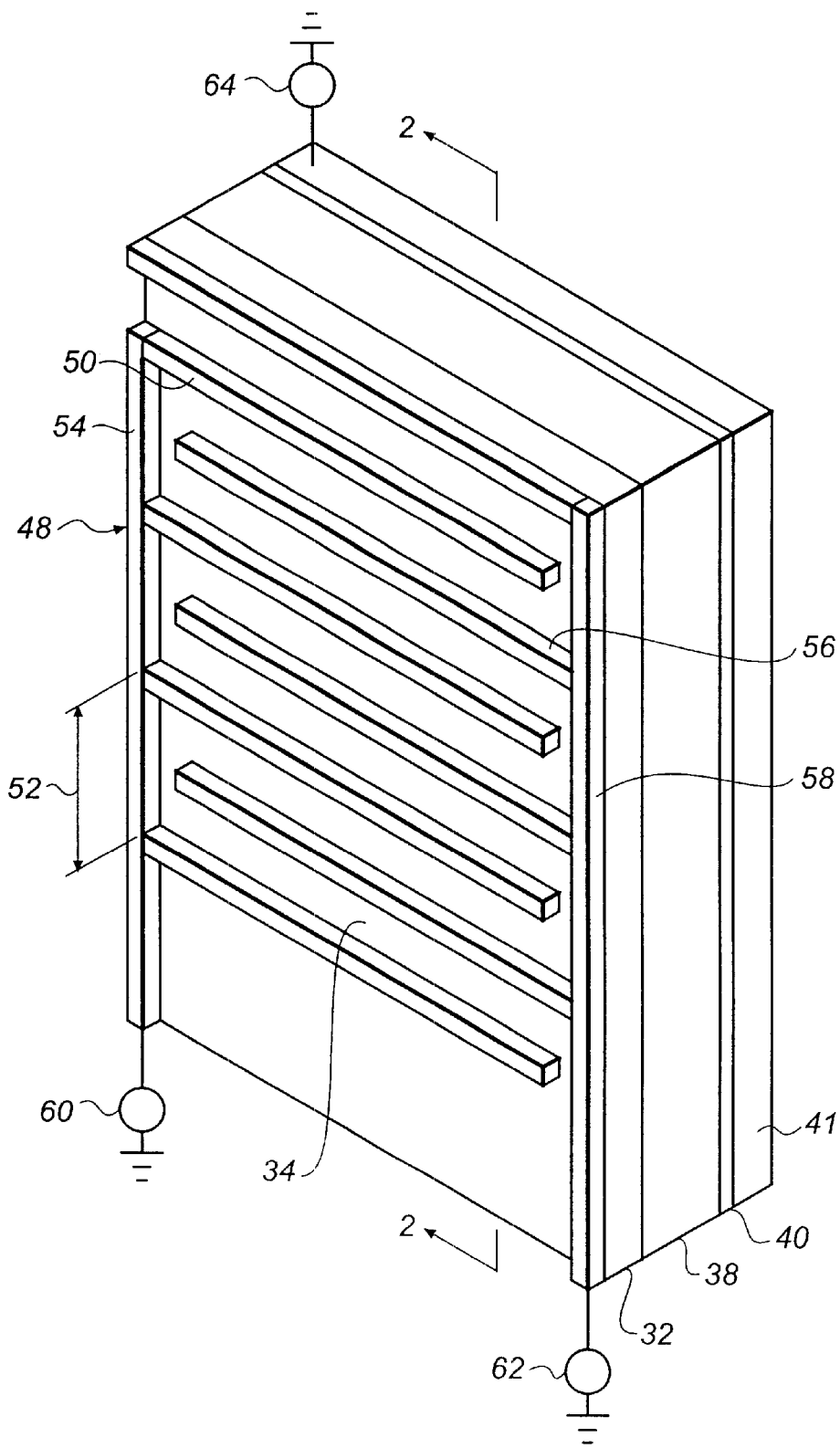
FIG. 1 is a schematic perspective view of a portion of a micro-actuator according to the present invention.
Figure 2:
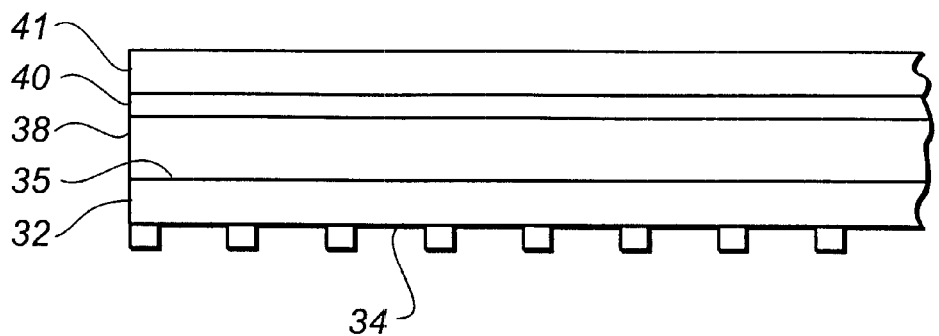
FIG. 2 is a cross-sectional view of the micro-actuator of FIG. 1.

Referring to FIGS. 1 and 2, a micro-actuator includes a support substrate 32 having a first surface 34 and a second surface 35. Surfaces 34 and 35 of substrate 32 are essentially parallel planes separated by the thickness of substrate 32. The second surface of substrate 32 carries a body 38 of deformable elastomer material. Substrate 32 is stationary and establishes a rigid mechanical boundary with deformable elastomer body 38 at their interface. An electrically conductive flexible electrode plate 40 is attached to elastomer body 38. A rigid, essentially non-deformable member 41 overlies electrode plate 40, but is not attached to the electrode plate.

Affixed to first surface 34 of substrate 32 is a grille electrode structure 48. Structure 48 further includes a plurality of first conductive fingers 50. Adjacent fingers 50 are displaced by a first period 52. First period 52 is perpendicular to the thickness between the first and second surfaces of substrate 32. The drawings show grille electrode structure 48 on the outer surface of support substrate 32. Persons skilled in the art will understand that electrode structure may be attached to the inner surface of support substrate 32 so as to extend into elastomer body 38.

Fingers 50 are electrically connected by a first buss 54. Structure 48 further includes a plurality of second conductive fingers 56. Adjacent fingers 56 are displaced by period 52. Fingers 56 are electrically connected by a second buss 58. Fingers 50 and fingers 56 are interwoven to create grille electrode structure 48.

First buss 54 is electrically connected to a first voltage source 60. Second buss 58 is electrically connected to a second voltage source 62. Conductive metallic electrode plate 40 is electrically connected to a third voltage source 64. As well understood by those knowledgeable in the state of the art, electrically connecting first buss 54 and second buss 58 to respective voltage sources and applying a voltage to conductive metallic electrode plate 40 allows a periodic electric field to be established in deformable elastomer body 38. Polarity and magnitude of the voltage sources are selected to be compatible with the resolution and speed of response requirements for the application under consideration.

Figure 3:
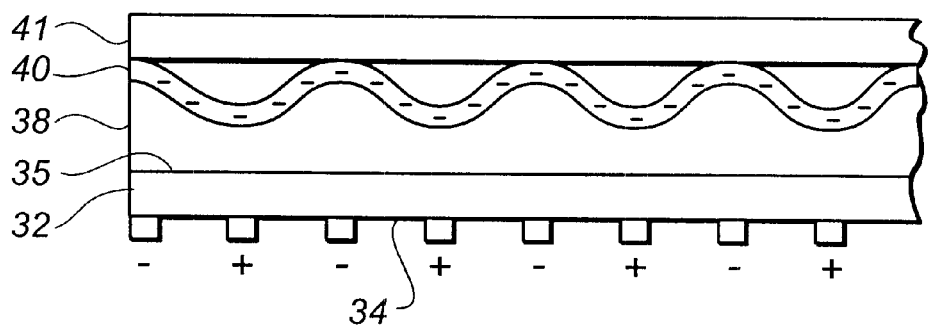
FIG. 3 is a cross-sectional view similar to FIG. 2, showing the micro-actuator in another state.
Figure 4:
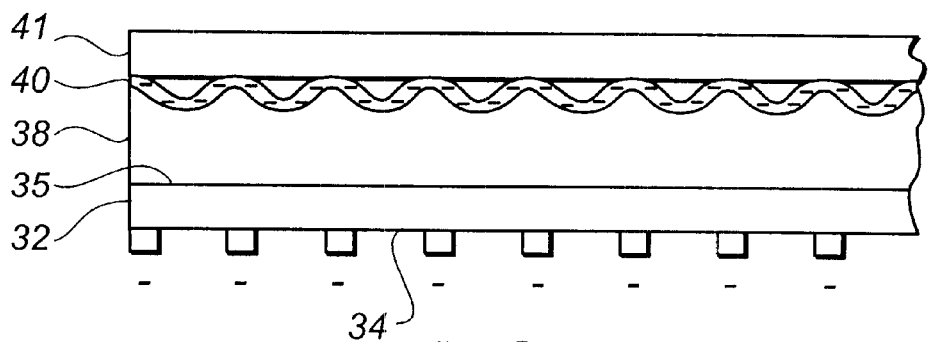
FIG. 4 is a cross-sectional view similar to FIGS. 2 and 3, showing the micro-actuator in still another state.

In operation, an electric field is established across deformable elastomer body 38 in a direction normal the planes of electrode structure 48 and electrode plate 40 by applying potential from sources 60 and 62 to busses 54 and 58, respectively. If the polarity of the grille electrode fingers and electrode plate 40 is different, the mechanical force of attraction between a finger and electrode plate 40 due to the electric field causes deformable elastomer layer to locally compress. Of course, a finger and electrode plate 40 will repulse and cause the elastomer layer to locally deform in expansion if like electrical poles are applied to a finger and electrode plate 40. FIG. 3 shows the situation where the polarities of sources 60 and 62 are different. Every other finger 50, 56 carries an opposite charge. Electrode plate 40 is alternately repelled and attracted to busses 54 and 58. In contrast, FIG. 4 shows the situation where the polarities of sources 60 and 62 are the same, and are the same as that of electrode plate 40. Each finger 50, 56 repels an associated portion of electrode plate 40.

As the body of elastomer material locally compresses and expands due to inhomogeneous spatially varied mechanical forces across the body, a ripple effect occurs at its surface. The thickness variations result in localized growth of the body, pushing rigid member 41 upwardly as shown in the drawings. Such movement can be used to actuate varies mechanisms as desired.

Deformable elastomer body 38 may comprise any suitable elastomer material, such as for example natural rubber or synthetic polymers with rubber-like characteristics (silicone rubber, styrenebutadiene, polybutadiene, neoprene, butyl, polyisoprene, nitrile, urethane, polydimethylsioxane, and ethylene rubbers). Elastomers having relatively high dielectric strength will allow the devices to be operated at higher voltage levels, which in many instances may be preferred.

Suitable selection of a particular elastomer material which exhibits an elastic modulus appropriate for a predetermined intended use is within ordinary skill given the description herein. For example, a relatively more stiff elastomer will typically recover more rapidly when an electric field is removed. On the other hand, an elastomer material having a relatively low elastic modulus is typically capable of greater deformations for a given value of electric field.

Electrode plate 40 should have good lateral conductivity, excellent stability, and little internal stress; as well as being highly adherent to deformable elastomer body 38. Suitable materials for electrode plate 40 include gold, silver, chromium, nickel, aluminum, conducting polymer, etc. Electrode plate 40 may be formed such as by chemical reaction, precipitation from a solution, electrophoresis, electrolysis, electroless plating, vapor deposition and others. The thickness of electrode plate 40 may, for example, be in the range of from about 200 angstroms to about 5,000 angstroms depending upon any desired flexibility, and the requisite strength and conductivity.

Inhomogeneous electric fields will lead to electrostatic forces on deformable elastomer body 38. Inhomogeneous electric fields in deformable elastomer body 38 are related to the electrostatic forces applied to conductor 40. As previously identified, conductor 40 is carried by the second surface of deformable elastomer body 38. Varying electrostatic forces applied to conductor 40 varies deformation of the second surface of deformable elastomer body 38. As previously identified, the first surface of deformable elastomer body 38 is stationary and deformations of the second surface of deformable elastomer body 38 lead to thickness variations in deformable elastomer body 38. Thickness of deformable elastomer body 38 is utilized to characterize variations in separation between the first surface of deformable elastomer body 38 and its second surface.

What is claimed is:

1. A micro-actuator for applying a mechanical force to a member to be moved; said micro-actuator comprising:

a body of deformable elastomer material having opposed first and second surfaces spaced apart in a first direction by a predetermined at-rest dimension;

a charge mechanism coupled to said first opposed surface of said body, said charge mechanism being adapted to apply an electrical charge across said body in said first direction, said charge being spatially varied in a second direction substantially normal to said first direction so as to create spatially varied mechanical forces across the body such that body exhibits spatially varied growth in said first direction; and a rigid member associated with the second opposed surface of the body so as to move in said first direction in response to growth of the body.

2. A micro-actuator as set forth in claim 1 wherein the charge mechanism comprises a grille electrode connectable to an electrical potential source so as to establish said spatially varied electrical charge.

3. A micro-actuator as set forth in claim 2 wherein the charge mechanism further comprises an electrically conductive flexible layer on said second surface between said second surface and said rigid member, said flexible layer being connectable to an electrical potential source so as to induce a force between the flexible layer and said grille electrode upon application of an electrical field.

4. A micro-actuator as set forth in claim 2 further comprising a stationary rigid substrate between the first surface and said grille electrode to establish a rigid mechanical boundary at the first surface.

5. A micro-actuator as set forth in claim 2 wherein said grille electrode comprises a plurality of conductive fingers spaced apart in said second direction.

6. A method for applying a mechanical force to a member to be moved; said method comprising:

providing a micro-actuator having a body of deformable elastomer material with opposed first and second surfaces spaced apart in a first direction by a predetermined at-rest dimension;

providing a rigid member associated with the second opposed surface of the body;

applying an electrical charge across said body in said first direction, said charge being spatially varied in a second direction substantially normal to said first direction so as to create spatially varied mechanical forces across the body such that body exhibits spatially varied growth in said first direction so as to move the rigid member in said first direction in response to growth of the body.

* * * * *